United States Patent
Huelke et al.

(10) Patent No.: US 10,106,017 B2
(45) Date of Patent: Oct. 23, 2018

(54) SUN VISOR ASSEMBLY HAVING MULTIPLE MIRRORS

(71) Applicant: FORD GLOBAL TECHNOLOGIES, LLC, Dearborn, MI (US)

(72) Inventors: David Huelke, Milan, MI (US); Scott Holmes Dunham, Redford, MI (US); Anthony Ligi, Jr., Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 337 days.

(21) Appl. No.: 14/811,298

(22) Filed: Jul. 28, 2015

(65) Prior Publication Data
US 2017/0028823 A1 Feb. 2, 2017

(51) Int. Cl.
| B60Q 1/26 | (2006.01) |
| B60J 3/02 | (2006.01) |
| G02B 27/02 | (2006.01) |
| B60Q 3/252 | (2017.01) |

(52) U.S. Cl.
CPC ............ B60J 3/0282 (2013.01); B60Q 3/252 (2017.02); G02B 27/027 (2013.01)

(58) Field of Classification Search
CPC ....... B60J 3/0282; B60Q 3/252; G02B 27/027
See application file for complete search history.

(56) References Cited

U.S. PATENT DOCUMENTS

| 5,442,530 A * | 8/1995 | Viertel ................... B60Q 3/252 |
| | | 296/97.5 |
| 6,231,105 B1 | 5/2001 | Viertel |
| 8,038,199 B2 | 10/2011 | Marcus et al. |
| 2007/0267886 A1* | 11/2007 | Beck ...................... B60J 3/0282 |
| | | 296/97.1 |
| 2009/0013440 A1* | 1/2009 | Lai ....................... A42B 3/0426 |
| | | 2/15 |
| 2010/0090494 A1 | 4/2010 | Marcus et al. |
| 2011/0062741 A1 | 3/2011 | Xhunga |
| 2014/0362595 A1* | 12/2014 | Marcos Primo ....... B60J 3/0226 |
| | | 362/492 |

FOREIGN PATENT DOCUMENTS

| EP | 1184217 B1 | 7/2006 |
| WO | 2006031835 A2 | 3/2006 |

OTHER PUBLICATIONS

Bell Automotive Products, Inc.: "Magnifying Visor Mirror". bellautomotive.com
English machine translation of EP1184217B1.

* cited by examiner

*Primary Examiner* — Ali Alavi
(74) *Attorney, Agent, or Firm* — Vichit Chea; King & Schickli, PLLC

(57) ABSTRACT

A sun visor assembly including a visor body and a mirror panel pivotally connected to the visor body. The mirror panel includes a first mirror oriented in a first direction and a second mirror oriented in a second direction. The two mirrors have different magnification factors.

19 Claims, 6 Drawing Sheets

FIG. 4

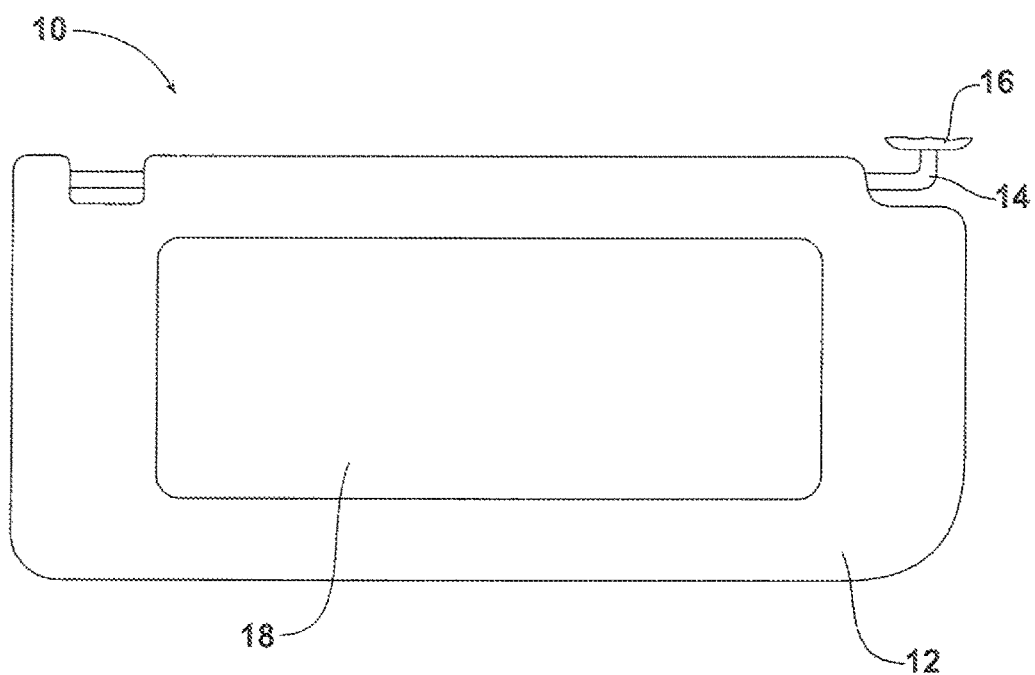

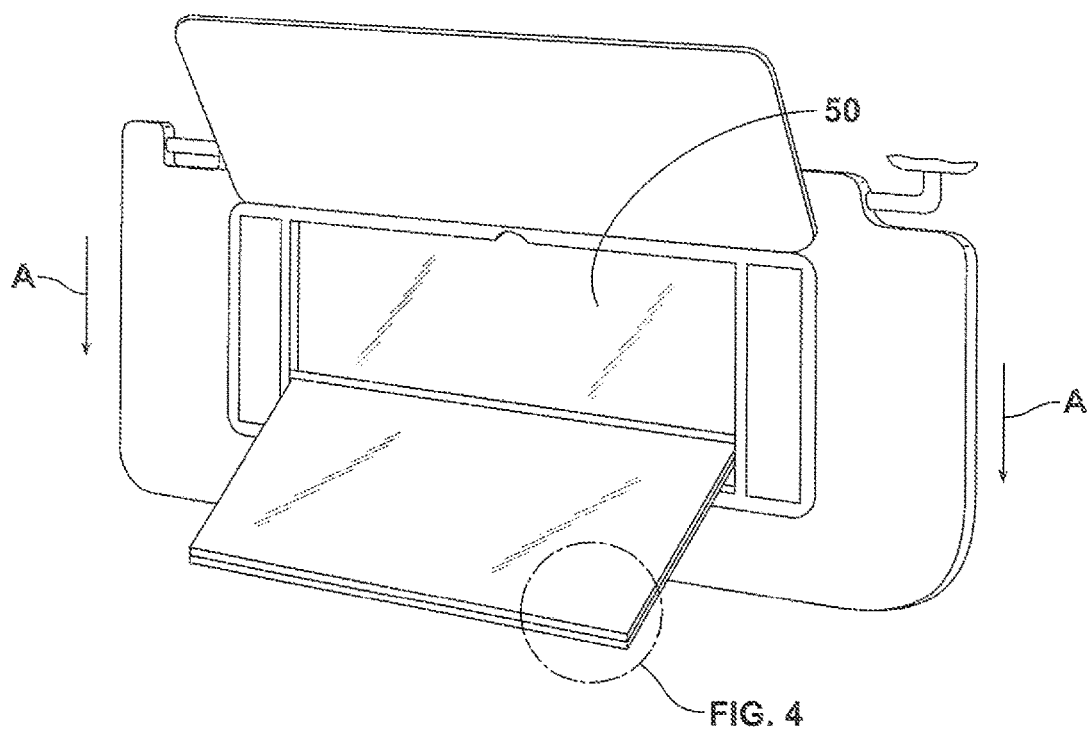

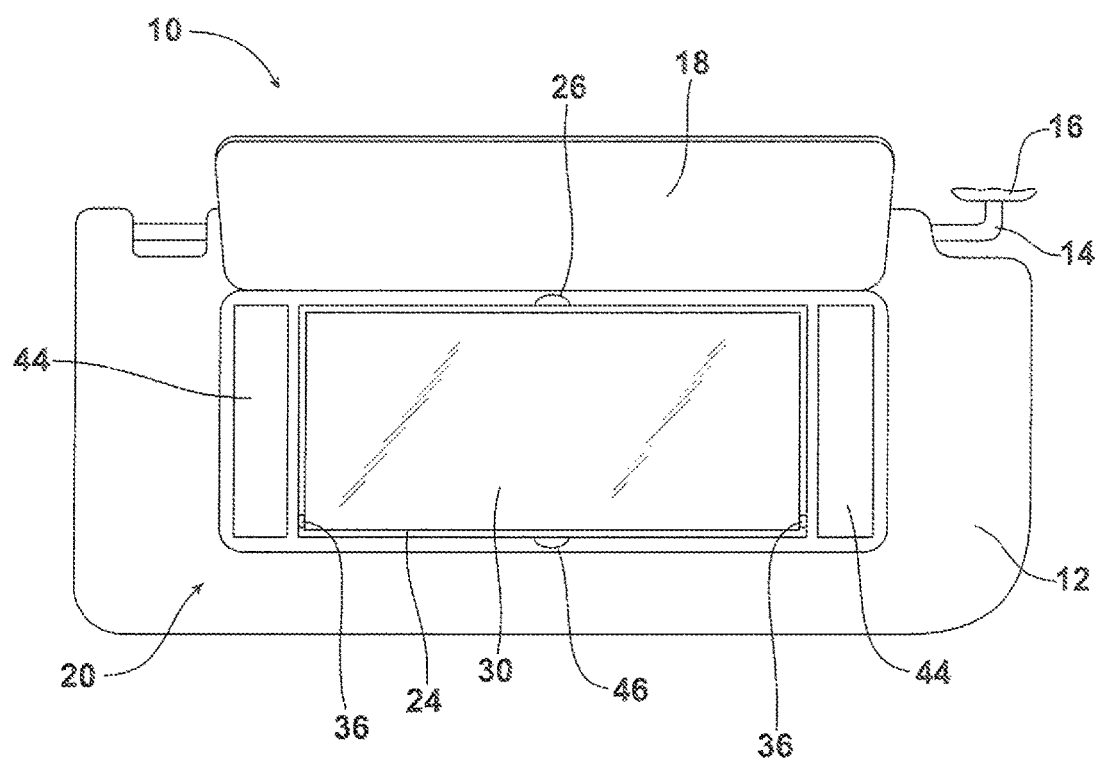

SUN VISOR ASSEMBLY HAVING MULTIPLE MIRRORS

TECHNICAL FIELD

This document relates generally to the motor vehicle equipment field and, more particularly, to a sun visor assembly with multiple mirrors including, particularly, mirrors providing different levels or factors of magnification.

BACKGROUND

It has long been known to equip motor vehicles with one or more sun visors adjacent the upper edge of the windshield. Such sun visors may be folded down from a storage position adjacent the headliner across the upper portion of the windshield in order to provide screening of the sun's rays coming through the windshield when the sun is low in the sky.

It has also long been known to equip a sun visor with a vanity mirror. While a single mirror provides a number of user benefits, the availability of multiple mirrors with different magnification factors would greatly benefit the user in many instances. For example, a mirror of increased magnification could be very beneficial when one seeks to do a delicate task like applying eyeliner or mascara to the eyelashes. This document relates to a sun visor assembly incorporating multiple mirrors with different magnification factors for the convenience and benefit of the user.

SUMMARY

In accordance with the purposes and benefits described herein, a sun visor assembly is provided. That sun visor assembly comprises a visor body, a mirror panel pivotally connected to the visor body, a first mirror carried on the first face of the mirror panel and a second mirror carried on a second face of the mirror. In one embodiment, the first face is opposite the second face. Further, in one possible embodiment, a third mirror is carried on the sun visor body.

In one possible embodiment the mirror panel includes opposed pivot pins. Further, the visor body includes opposed guide tracks receiving the opposed pivot pins. More specifically, the opposed pivot pins are carried on the mirror panel adjacent a first edge of the mirror panel.

In one possible embodiment, the third mirror is carried on the visor body between the opposed guide tracks. In any of the embodiments, the mirror panel may be selectively displaceable between a first position wherein the first mirror is facing and juxtaposed to the visor body and a second position when the second mirror is facing and juxtaposed to the visor body.

In one possible embodiment, each pivot end of the opposed pivot pins includes an enlarged head and each guide track of the opposed guide tracks includes a channel that receives and captures the enlarged head of one of the pivot pins.

In one possible embodiment, the visor body includes a first notch adjacent one edge of the third mirror and a second notch adjacent a second edge of the third mirror whereby a user may insert a finger in either of the notches in order to engage and turn the mirror panel. In one particularly useful embodiment, the first mirror has a first magnification factor $M_1$, the second mirror has a second magnification factor $M_2$ and the third mirror has a third magnification factor $M_3$, where $M_1 \neq M_2 \neq M_3$.

In one possible embodiment, a support is provided for connecting the sun visor assembly to the motor vehicle. The visor body is pivotally received on that support. In one possible embodiment, a light source is carried on the visor body. The light source may comprise a first lamp outboard a first end of the third mirror and a second lamp outboard a second end of the third mirror.

In one possible embodiment, a hinged cover is carried on the visor body. The hinged cover overlies the first, second and third mirrors when in the closed position. Further, in one possible embodiment, two-sided adhesive tape is provided between the first mirror and the second mirror on the mirror panel.

In accordance with an additional aspect, a sun visor assembly is provided comprising a visor body, a first mirror carried on the visor body, a second material carried on the visor body, and a third mirror carried on the visor body.

In the following description, there are shown and described several preferred embodiments of the sun visor assembly. As it should be realized, the sun visor assembly is capable of other, different embodiments and its several details are capable of modification in various, obvious aspects all without departing from the sun visor assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the sun visor assembly and together with the description serve to explain certain principles thereof. In the drawing figures:

FIG. 1 is a front elevational view of the sun visor assembly that is the subject matter of this document. FIG. 1 shows the hinged cover in the closed position.

FIG. 2b illustrates how the mirror panel may be pivoted and flipped to either expose the third mirror carried on the visor assembly for viewing or to change from the first mirror to the second mirror for viewing.

FIG. 2c illustrates the second mirror in position for viewing on the sun visor assembly.

Figure 2A:
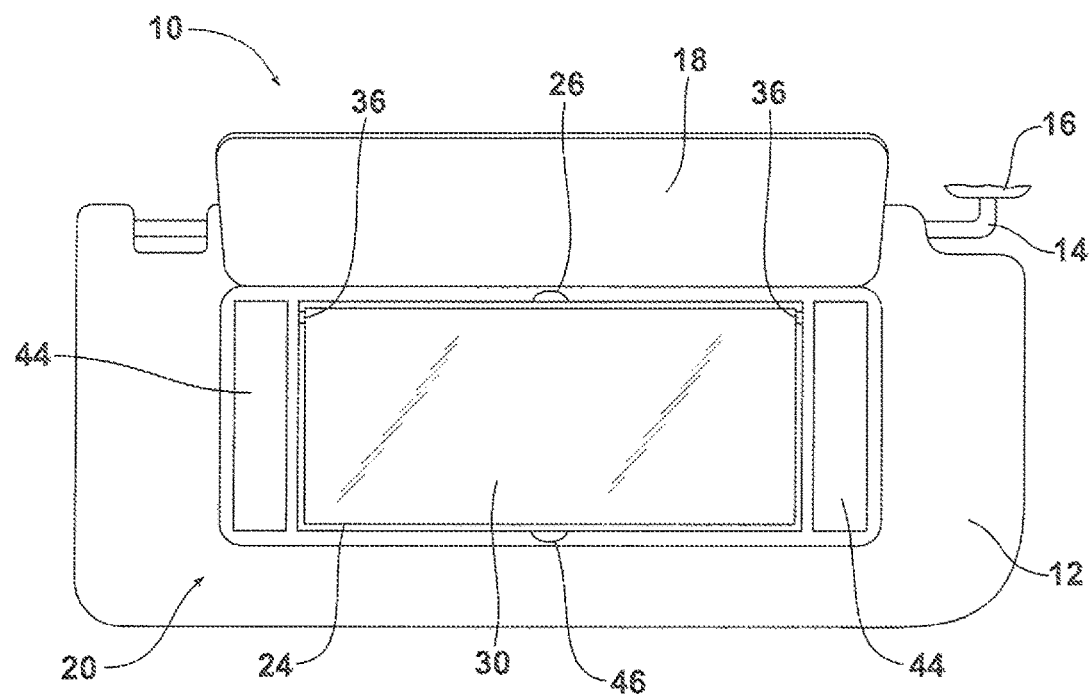
FIG. 2a is a view similar to FIG. 1 illustrating the hinged cover in the open position, exposing the first vanity mirror for viewing.

Reference will now be made in detail to the present preferred embodiments of the sun visor assembly, examples of which are illustrated in the accompanying drawing figures.

DETAILED DESCRIPTION

Reference is now made to FIGS. 1-4 illustrating the sun visor assembly 10 that is the subject matter of this document. As illustrated in FIG. 1, that sun visor assembly 10 includes a visor body 12 that is pivotally connected to a support or rod 14 that pivotally connects the sun visor assembly 10 to the motor vehicle at an anchor point 16. This arrangement allows the visor body 12 to be pivotally moved on the support rod 14 between a stowed position adjacent the headliner of the motor vehicle and a use position across the top of the windshield in a manner known in the art. As illustrated in FIG. 1, a hinged cover 18 is carried on the visor body 12. That hinged cover 18 is illustrated in the closed position in FIG. 1.

Figure 3:
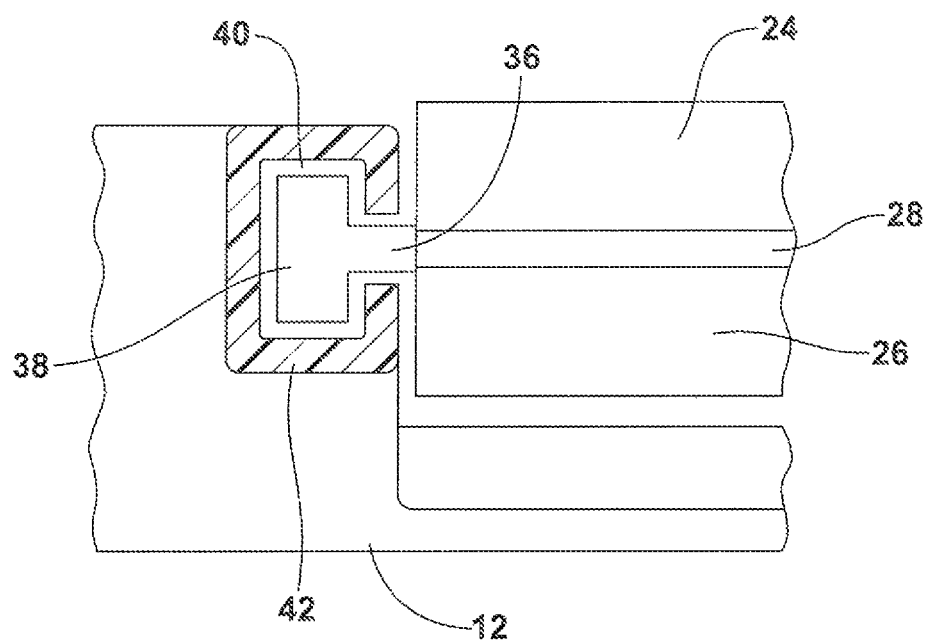
FIG. 3 is a detailed cross-sectional view illustrating how a pivot pin on one end of the mirror panel is received in a guide channel formed in the vanity bezel carried on the visor body.
Figure 4:
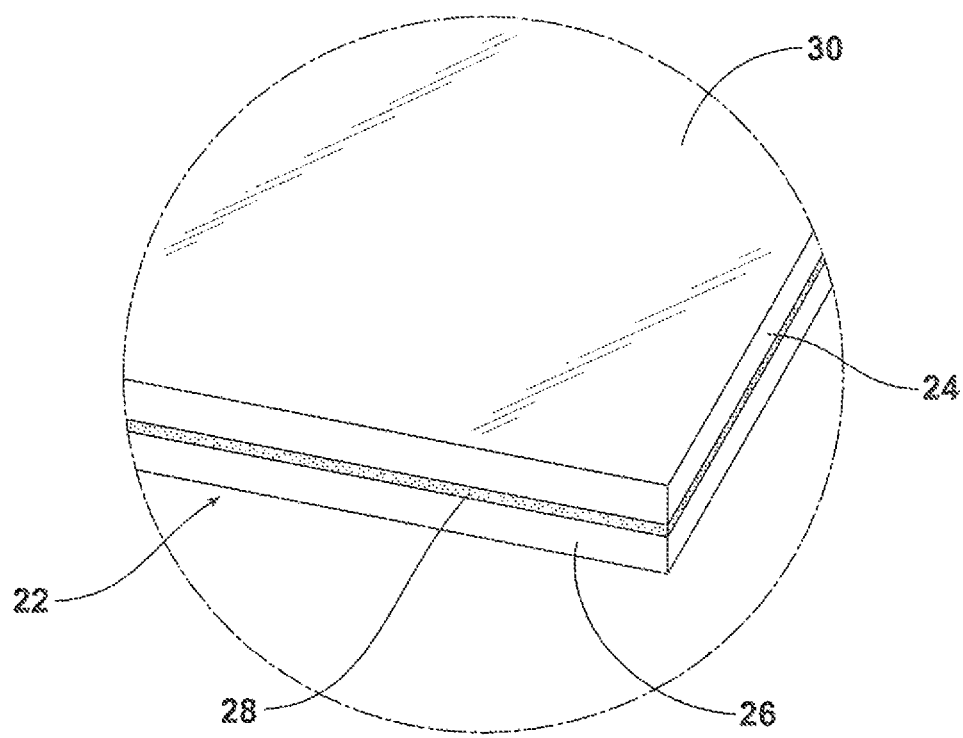
FIG. 4 is a detailed view of a corner of the mirror panel, as illustrated in FIG. 2b.

Reference is now made to FIGS. 2a-4, which illustrate the vanity assembly 20 that is carried by the visor body 12. As illustrated, the vanity assembly 20 includes a mirror panel 22. The mirror panel 22 comprises a first mirror 24 and a second mirror 26 that are connected together by dual sided adhesive tape 28, with the reflective face 30 of the first mirror 24 and the reflective face 32 of the second mirror 26 exposed and oriented in opposite directions. The mirror panel 22 also includes a bracket 34 that holds the two mirrors 24, 26 together within a channel. The bracket 34 includes a pivot pin 36 at each end. As illustrated in FIG. 3, each pivot pin 36 includes an enlarged head 38 that is received and captured in a guide track 40 at one end of the vanity frame or bezel 42 carried on the visor body 12.

As further illustrated with reference to FIGS. 2a-2c, the opposed pivot pins 36 carried on the bracket 34 of the mirror panel 22 are received in opposed guide tracks 40 in the bezel 42. When the mirror panel 22 is in the first operating position and the hinged cover 18 is raised/pivoted open as illustrated in FIG. 2a, the reflective face 30 of the first mirror 24 is exposed for viewing. Two light sources 44, outboard the ends of the mirror 24 may provide lighting for viewing. As should be appreciated from viewing FIG. 2a, when the mirror panel 22 is in the first operative position, the opposed pivot pins 36 are held at the top end of the guide track 40.

Reference is now made to FIG. 2b, illustrating how the mirror panel 22 is flipped in order to displace the mirror panel into the second operating position illustrated in FIG. 2c. More specifically, a user inserts the tip of a finger into the notch 46 formed in the bezel 42 carried on the visor body 12 so as to pivot the bottom edge 48 of the mirror outwardly from the visor body 12 about the pivot axis formed by the opposed pivot pins 36. Next, the mirror panel 22 is manipulated in order to slide the pivot pins 36 downward in the direction of action arrows A in FIG. 2b along the guide tracks 40 until those pivot pins reach the bottom of the guide tracks. At that point, the mirror panel 22 is again pivoted about the axis formed by the pivot pins 36 so as to be repositioned in a seated position within the bezel 42 with the reflective face 32 of the second mirror 26 exposed for viewing (see FIG. 2c).

As should be appreciated, a notch 48, similar to the notch 46, is provided in the upper portion of the bezel 42 on the visor body to allow insertion of a finger to flip the mirror back to the first operating position when desired.

In one possible embodiment of the sun visor assembly 10, a third, optional mirror 50 is mounted on the visor body 12 behind the bezel 42. As illustrated in FIG. 2b, that third mirror 50 is exposed for viewing when the mirror panel 22 is in the third operating position. In one particularly useful embodiment of the sun visor assembly 10, the first mirror 24 has a first magnification factor $M_1$, the second mirror 26 has a second magnification factor $M_2$ and the third mirror 50 has a third magnification factor $M_3$, where $M_1 \neq M_2 \neq M_3$. For example, in one possible embodiment, the first mirror 24 has a magnification factor of 1×, while the second mirror 26 has a magnification factor of 3× and the third mirror 50 has a magnification factor of 5×. The different magnification factors of the mirrors can be a very beneficial and convenient feature when a user is performing certain tasks such as applying makeup.

As should be appreciated, when the mirror panel 22 is in the first operating position and the reflective face 30 of the first mirror 24 is exposed for viewing, the second mirror 26 is facing and juxtaposed to the visor body 12 or optional third mirror 50 if present. In contrast, when the mirror panel 22 is in the second operating position and the reflective face 32 of the second mirror 26 is exposed for viewing (note FIG. 2c) the first mirror 24 is facing juxtaposed to the visor body 12 or optional third mirror 50 if present.

The foregoing has been presented for purposes of illustration and description. It is not intended to be exhaustive or to limit the embodiments to the precise form disclosed. Obvious modifications and variations are possible in light of the above teachings. For example, the first and second mirrors 24, 26 could be connected together by an appropriate adhesive instead of the dual sided adhesive tape 28 discussed above. All such modifications and variations are within the scope of the appended claims when interpreted in accordance with the breadth to which they are fairly, legally and equitably entitled.

What is claimed:

1. A sun visor assembly, comprising:
a visor body;
a support for connecting said sun visor assembly to a motor vehicle, said visor body being pivotally received on said support; and
a mirror panel pivotally connected to said visor body, said mirror panel including a first mirror oriented in a first direction and a second mirror oriented in a second direction.

2. The sun visor assembly of claim 1 wherein said first direction is opposite said second direction.

3. The sun visor assembly of claim 1 wherein a third mirror is carried on said sun visor body.

4. The sun visor assembly of claim 3, wherein said mirror panel includes opposed pivot pins.

5. The sun visor assembly of claim 4, further including opposed guide tracks for receiving said opposed pivot pins.

6. The sun visor assembly of claim 5, wherein said opposed pivot pins are carried on said mirror panel adjacent a first edge of said mirror panel.

7. The sun visor assembly of claim 6, wherein said third mirror is carried on said visor body between said opposed guide tracks.

8. The sun visor assembly of claim 7, wherein said mirror panel is selectively displaceable between a first position wherein said second mirror is facing and juxtaposed to said visor body and a second position wherein said first mirror is facing and juxtaposed to said visor body.

9. The sun visor assembly of claim 8, wherein each pivot pin of said opposed pivot pins includes an enlarged head and each guide track of said opposed guide tracks includes a channel that receives and captures said enlarged head.

10. The sun visor assembly of claim 8, further including a vanity bezel, said vanity bezel including a first notch adjacent one edge of said mirror panel and a second notch adjacent a second edge of said mirror panel whereby a user may insert a finger in either of said first notch and said second notch in order to engage and turn said mirror panel.

11. The sun visor assembly of claim 8 wherein said first mirror has a first magnification factor $M_1$, said second mirror has a second magnification factor $M_2$ and said third mirror has a third magnification factor $M_3$ wherein $M_1 \neq M_2 \neq M_3$.

12. The sun visor assembly of claim 3, wherein said first mirror has a first magnification factor $M_1$, said second mirror has a second magnification factor $M_2$ and said third mirror has a third magnification factor $M_3$ where $M_1 \neq M_2 \neq M_3$.

13. The sun visor assembly of claim 3, further including a hinged cover carried on said visor body, said hinged cover overlying said first mirror, said second mirror and said third mirror when in a closed position.

14. The sun visor assembly of claim 3, further including a light source carried on said visor body.

15. The sun visor assembly of claim 14, wherein said light source comprises a first lamp outboard a first end of said third mirror and a second lamp outboard a second end of said third mirror.

16. The sun visor assembly of claim 3, further including two sided adhesive tape between said first mirror and said second mirror.

17. The sun visor assembly of claim 16, further including a light source carried on said visor body adjacent said third mirror.

18. The sun visor assembly of claim 17, further including a hinged cover carried on said visor body, said hinged cover overlying said third mirror, said mirror panel and said light source when in a closed position.

19. A sun visor assembly, comprising:
   a visor body pivotally connected to a motor vehicle;
   a first mirror carried on said visor body;
   a second mirror carried on said visor body; and
   a third mirror carried on said visor body.

* * * * *